Nov. 20, 1934.  G. TABOZZI  1,981,397
FILTER
Filed Sept. 25, 1933
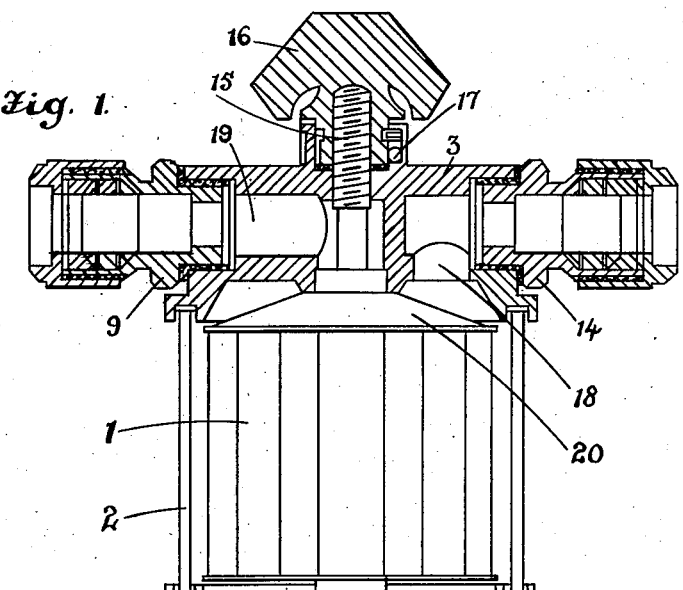
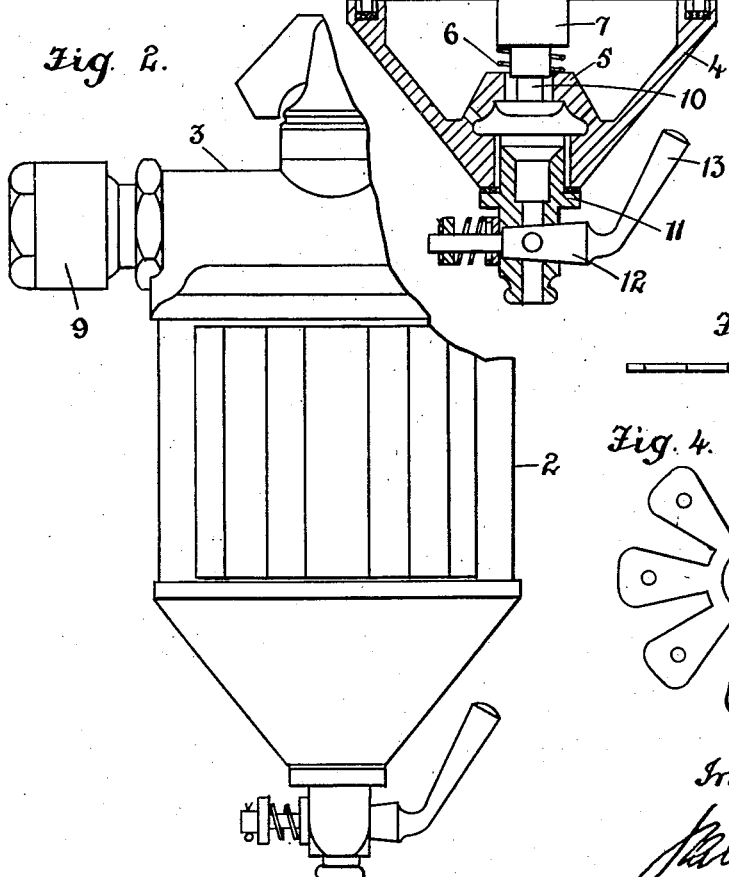
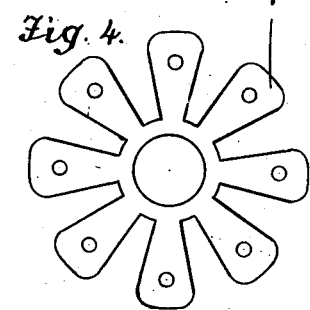
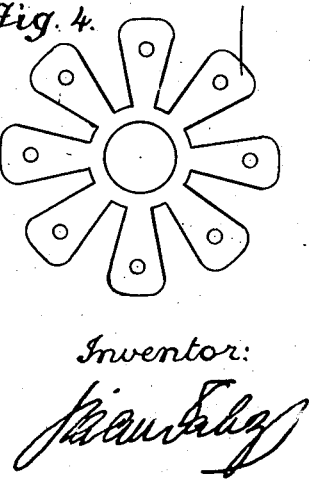
Inventor:

Patented Nov. 20, 1934

1,981,397

UNITED STATES PATENT OFFICE 1,981,397

FILTER

Giacinto Tabozzi, Milan, Italy

Application September 25, 1933, Serial No. 690,871

1 Claim. (Cl. 210—165)

This invention relates to a filter of the kind in which the component parts are mounted upon a central stem and a detachable cover or upper part of a chamber is provided with an inlet and outlet pipe for the flow of the unfiltered and filtered liquid, which latter passes through a filtering medium of wire gauze in the shape of a drum, or consists of a frame with a plurality of radial vertical extensions which are covered with fabric or the like, and has for its object to provide an improved construction which can be fitted into an existing pipe line and without interfering with the rate of flow of the liquid.

According to the present invention the filter consists of a drum shape filtering medium of fine wire mesh provided with a plurality of radially disposed vertical extensions. A conical disc is mounted above said filtering medium on to which flows the liquid to be filtered and which distributes the incoming flow into a filter chamber. A detachable truncated cone shaped cover with a two way cock is connected to the base of the chamber whereby the sediment collecting in the chamber can be easily withdrawn through said cock.

The truncated cone is provided with a bridge piece adapted to form an abutment for a central stem upon which is mounted the component parts of the filter.

The advantage of providing a very large filter surface is that, a wire sieve of a very fine mesh can be used, and the filtering can continue for long periods without the filter being cleaned, which is especially advantageous when used in the pipe lines of an internal combustion engine for road vehicles and more especially areoplanes.

The accompanying drawing illustrates a convenient embodiment of the invention, in which Fig. 1 is a sectional elevation of the filter.

Fig. 2 is a part view in elevation of Fig. 1,

Fig. 3 is a detail of the filter, and

Fig. 4 is a plan view showing the shape of the filter.

The filter 1 is in the form of a drum with a number of vertical extensions constructed of a very fine wire mesh. The part 2 is a glass cylinder, placed in annular seats formed in the upper cover 3 and in the lower cover 4. In the upper cover are conduits 18 and 19 arranged in the same axis to which are attached the unions of the feed pipe 14 and discharge pipe 9 respectively. The conduit 18 forms a communication with the chamber between the glass cylinder 2 and the filter 1, and the conduit 19 communicates with the interior of the drum which is mounted upon a brass stem 10, which is guided and held below, in a central hole of a bridge piece 5 formed on the interior of the lower cover 4, whilst at the upper end it is guided in the upper cover and secured by means of a wing nut 16 screwed on the upper end 15, of the stem 10, the said nut being engaged in a collar, formed in the upper cover, in which there is a locking ball controlled by a spring cooperating with a circular series of small recesses, such as to guarantee the stability of the positions taken by the nut.

In order to hold the filter 1 in position, a helical spring 6 and guide 7 are interposed between the underside of the filter 1 and the bridge piece 5.

The lower cover 4 is in the shape of a truncated cone and by its internal walls forms a very large chamber for collecting the impurities which can be drawn off through a two way cock with a handle 13, mounted in a union 11 screwed into the cover 4.

In the experiments which have been made, it has been found that the resistance offered by the filter to the flow of oil and petrol is practically nil and that it is permissible to use it on motors of 100 H. P., also on motors of a power up to 500 H. P.

Being given the small dimensions of the filter, it may be placed close to the pilot and serve as an indicator of the regularity of the flow of the oil or petrol. Its weight and minimum obstruction, in comparison with its filtering capacity, render it appropriate for use in aviation.

A truncated conical disc 20 mounted upon the top of the drum 1 serves to protect the upper part of the drum 1 from the jet coming from the inlet 18 by forming a roof which distributes the incoming flow into the filter chamber.

Having now particularly described and ascertained the nature of my said invention and in what manner the same is to be performed, I declare that what I claim is:—

A filter for liquids having in combination a central stem, a lower truncated cover with an annular recess in the top and a threaded orifice in the base, a bridge-piece integral with said cover provided with an aperture through which passes said central stem, one end thereof abutting against said bridge-piece, a cock screwed into said threaded orifice for withdrawing impurities collecting within said lower cover, a helical spring inserted over the central stem, a lobated filtering medium mounted upon the central stem, said helical spring interposed between the bridge-piece and lobated filtering medium, a cone-shaped disc mounted upon the top of said filtering medium over which flows the unfiltered liquid, a cylindrical glass cover mounted in the annular recess in said lower cover, an upper cover provided with an annular recess in the base engaging the upper end of said glass cover, a hollow extension at the top through which passes the end of the central stem and inlet and outlet conduits for the admission of unfiltered liquid and discharge of filtered liquid, unions fixed to said inlet and outlet conduits, a wing nut screwed on to the end of the central stem holding the component parts together and means co-operating between said wing nut and hollow extension of the upper cover for locking the wing nut against accidental rotation in relation to the central stem.

GIACINTO TABOZZI.